(12) United States Patent
Strandemar

(10) Patent No.: US 7,667,198 B2
(45) Date of Patent: Feb. 23, 2010

(54) IR CAMERA AND A METHOD FOR PROCESSING INFORMATION IN IMAGES

(75) Inventor: Katrin Strandemar, Rimbo (SE)

(73) Assignee: FLIR Systems AB, Danderyd (SE)

( * ) Notice: Subject to any disclaimer, the term of this patent is extended or adjusted under 35 U.S.C. 154(b) by 0 days.

(21) Appl. No.: 12/060,891

(22) Filed: Apr. 2, 2008

(65) Prior Publication Data

US 2009/0250611 A1 Oct. 8, 2009

(51) Int. Cl.
*H01L 31/02* (2006.01)
(52) U.S. Cl. ....................................... 250/330
(58) Field of Classification Search ................. 250/330, 250/332, 334

See application file for complete search history.

(56) References Cited

U.S. PATENT DOCUMENTS

2006/0289772 A1* 12/2006 Johnson et al. ........ 250/370.08

* cited by examiner

*Primary Examiner*—David P Porta
*Assistant Examiner*—Marcus H Taningco
(74) *Attorney, Agent, or Firm*—Morrison & Foerster LLP

(57) ABSTRACT

The invention relates to a camera having optical systems for recording both IR images and visual images and a laser pointer. A method of determining the position of the laser spot in the IR image based on the position of the laser spot in the visual image is proposed. One or more parameters related to the displacement between the visual image and the IR image are used to determine the displacement of the laser spot in the IR image compared to the position detected in the visual image. In cameras providing functions for fusion or blending of IR and visual images, such parameters are determined during calibration to enable alignment of the images captured by the different optical systems. Hence, in such cameras, the displacement parameters are already present.

16 Claims, 3 Drawing Sheets

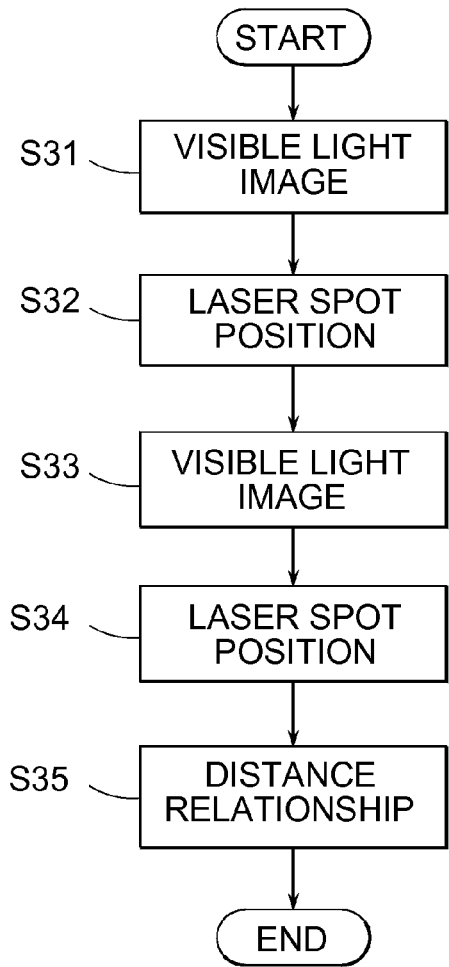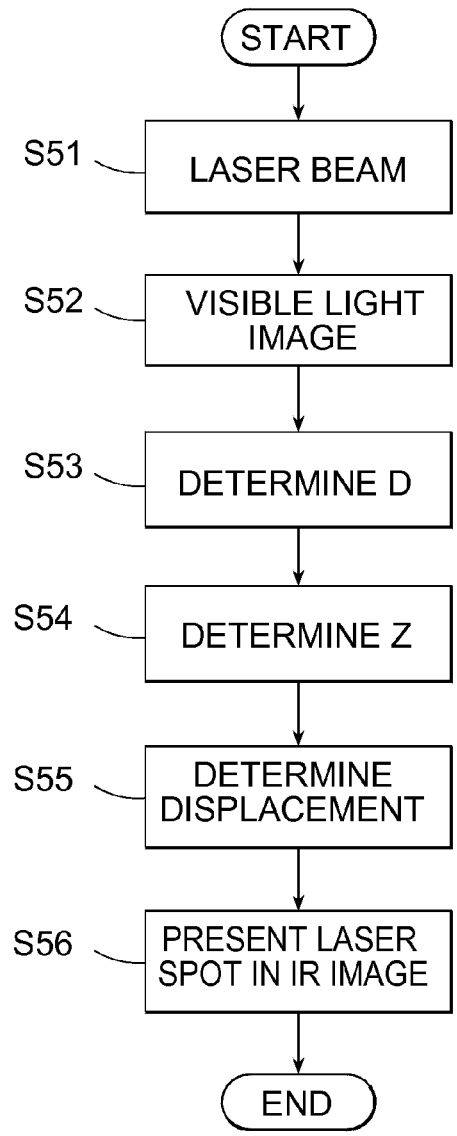
Fig. 3
Fig. 5

IR CAMERA AND A METHOD FOR PROCESSING INFORMATION IN IMAGES

TECHNICAL FIELD

The present invention relates to detection of laser light in an infrared image captured by an IR camera.

BACKGROUND

In various applications there is a growing need to determine accurately the position of hot and cold spots that will appear in an infrared image.

It is not always easy to map a visual picture to a thermal image taken by an infrared camera of the same object. Interesting characteristics that appear in the visual spectrum may be invisible in the infrared spectrum and vice versa.

For example, when viewing a construction wall comprising a pipe carrying heat, as is common in municipal heating networks, an essential construction detail, that is only visible in the visual spectrum of the radiation, as well as a heat leakage which is only visible in the infrared spectrum of the radiation, could be relevant information during a maintenance assignment.

Most IR cameras are equipped with a laser pointer, but the reflected laser light is detected only in the visual spectrum of the radiation and not in the infrared spectrum of the radiation. Hence, the laser point generated on the object by the laser pointer will be visible in the visual image but not in the IR image. It is therefore desirable to determine accurately the positions of hot and cold areas shown in the IR image by detecting reflected laser light. Moreover, current laser devices operating in the infrared spectrum of the radiation have too high energy and may also be harmful to objects or people in the vicinity.

SUMMARY

It is an object of the present invention to provide a method and an apparatus to detect laser light and indicate said laser light in an IR image.

The invention relates to a method for processing information in images comprising the steps of receiving emitted and reflected radiation from an object, generating a visual image and an infrared image based on the received radiation and generating a laser spot on the object by means of a laser pointing device. The method comprises the steps of detecting visual image coordinates of the laser spot in the visual image file, determining the IR image coordinates of the laser spot in the infrared image by the use of the detected visual image coordinates and at least one displacement parameter related to the displacement between the visual image and the infrared image, and highlighting the Ir image coordinates in the infrared image.

The invention also relates to an IR camera for processing information in images comprising a first imaging part for capturing IR image data of an object, a second imaging part for capturing visible light data of the object, a laser pointer for providing a laser spot on the object, and a processor for generating an IR image based on the IR image data and a visual image based on the visible light data;

a memory comprising means for storing the at least two different images and determined at least one calibration and fusion coefficient;

the processor being arranged to detect visual image coordinates of the laser spot in the visual image;

determine the IR image coordinates of the laser spot in the infrared image file by the use of the visual image coordinates and at least one displacement parameter related to the displacement between the visual image and the infrared image;

highlight the IR image coordinates in the infrared image file.

Hence, the invention relates to a method of determining the position of the laser spot in the IR image based on the position of the laser spot in the visual image. One or more parameters related to the displacement between the visual image and the IR image are used to determine the displacement of the laser spot in the IR image compared to the position detected in the visual image. In cameras providing functions for fusion or blending of IR and visual images, such parameters are determined during calibration to enable alignment of the images captured by the different optical systems. Hence, in such cameras, the displacement parameters are already present.

In one embodiment the processor is arranged to transform the coordinates by calculating the distance to the object by the coordinates of the reflected radiation, and the use of at least one calibration coefficient.

BRIEF DESCRIPTION OF THE DRAWINGS

FIG. 3 is a flow chart showing how the position of the laser point in a visual image as a function of the distance to the object may be determined during calibration.

FIG. 5 is a flow chart of how the position of the laser point may be indicated in the IR image.

DETAILED DESCRIPTION

Figure 1:
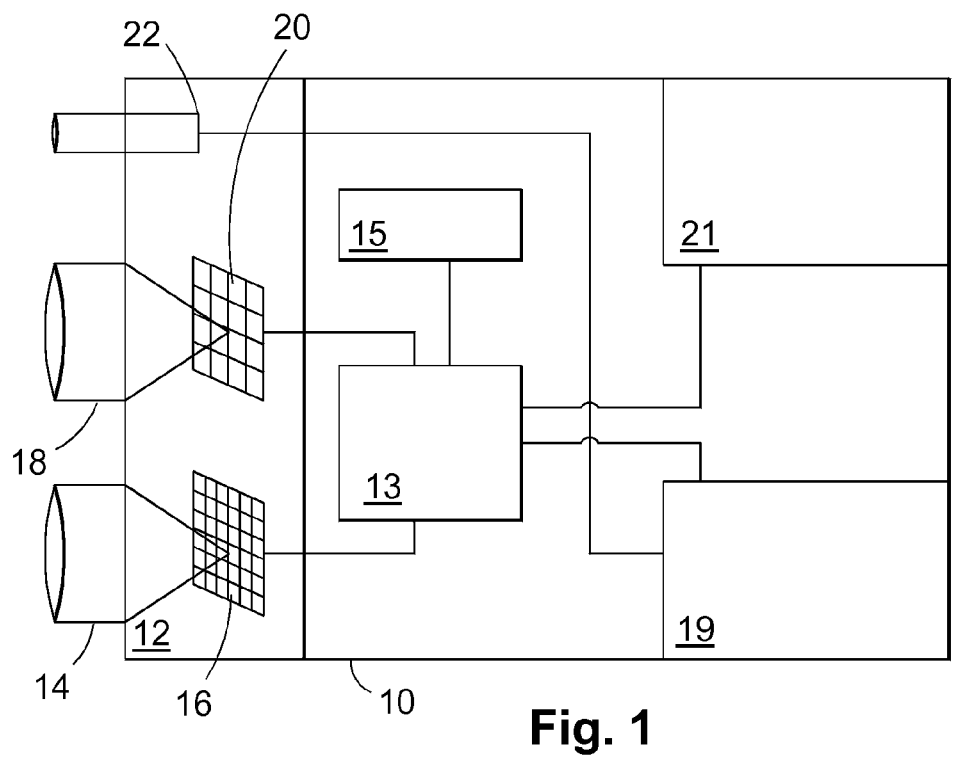
FIG. 1 is a schematic view of an IR camera.

FIG. 1 shows a schematic view of an IR camera 10 according to an embodiment of the invention. The IR camera 10 comprises an assembly 12 holding three optical systems which typically comprise one or more lenses and control devices for adjusting the lenses to capture the incoming radiation from an object.

The assembly 12 comprises a visual optical system 14 which comprises a visual sensor array 16 for the visual spectrum of the radiation, and an infrared optical system 18 comprising an infrared sensor array 20 for the infrared spectrum of the radiation. The final optical system comprised in the assembly 12 generates a laser beam and this system is known as a laser point system 22. The emitted laser beam is reflected on the object and is typically visible by the naked eye as a red spot (e.g. semiconductor AlGaINP Diode Laser 1 mW/635 nm).

The reflected light of the laser beam, as well as other emitted radiation from the object, is captured by the sensor arrays 16, 20 and turned into signals which are processed by a processing device 13 to produce both a visual image and an infrared image. The processing device 13 may also produce of the visual and infrared images typically a fused or blended image. Other possible data that may be displayed to a user of the IR camera may also be processed. The IR camera 10 comprises a memory storage 15 for storing the data registered or processed by the IR camera 10 as well as a plurality of control devices 19 (e.g. a display, thumb-joystick and record/push-buttons) and at least one interface medium 21 (e.g. wired or wireless connections, IRDA, Bluetooth, USB, FireWire, etc).

Since the sensor elements of the visual sensor array 16 are sensitive to the wavelength of the laser light, the reflected light of the laser beam may be detected in the visual image by its picture elements, i.e. pixels. The picture elements may, for example be CCDs (charge-coupled devices). This is not the case in the infrared sensor array 20.

Figure 2:
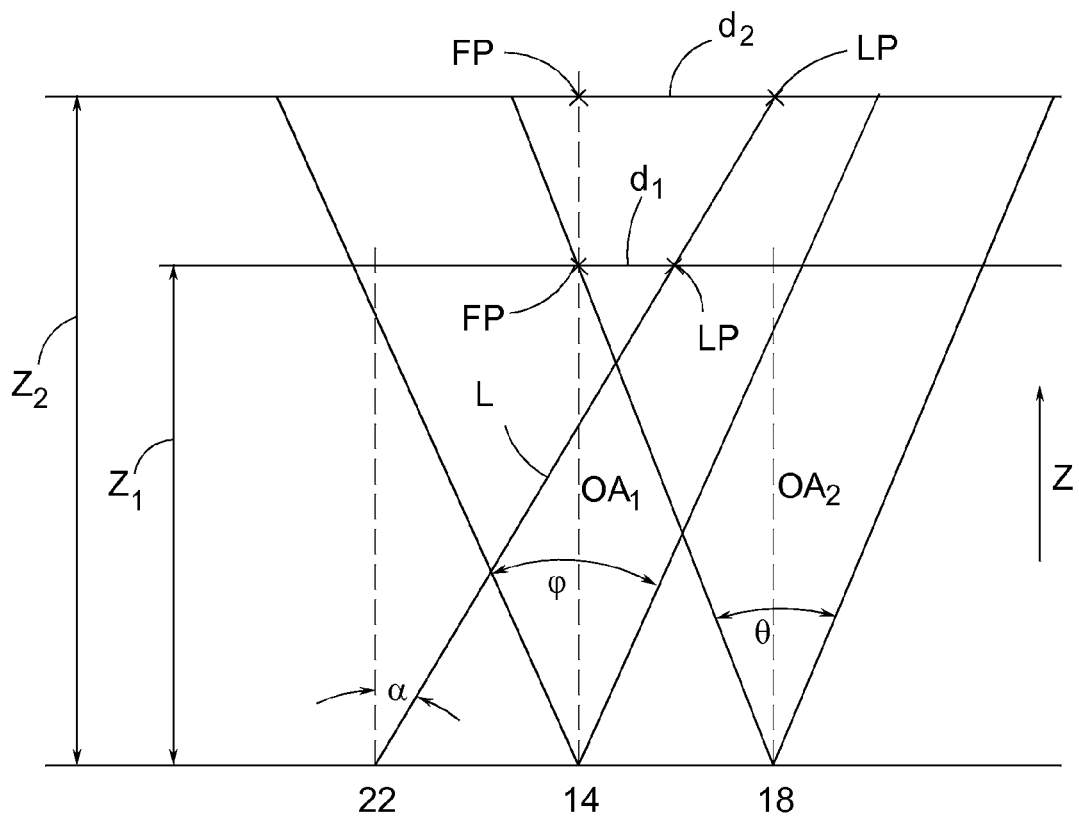
FIG. 2 shows a schematic view of an arrangement of the three optical systems of the inventive IR camera.

FIG. 2 illustrates the field of view of the visual optical system 14 of the IR camera 10 in FIG. 1, represented as an angle $\phi$ and the field of view of the infrared optical system 18 of the IR camera 10 in FIG. 1, represented as an angle $\theta$. The optical axes of both the visual optical system 14 and the infrared optical system 18 are shown as dashed lines OA1 and OA2, respectively. The laser beam is represented as a solid line L. As can be seen in FIG. 2 the laser beam L is emitted at a distance from the optical axis OA1 of the visual optical system 14 and with a certain angle $\alpha$ relative to the optical axis. A dotted line parallel to the optical axes OA1, OA2 is provided to illustrate the angle $\alpha$. As can be seen, the distance between the point where the laser beam hits the object (i.e. a laser point LP) and a fixed point FP in the field of view varies with the distance z between the IR camera and the object. The fixed point FP in the field of view is typically indicated by the bisector of the angle $\phi$, i.e. where the optical axis of the visual optical system 14 hits the object.

At the first distance z1 from the object, the distance between the laser point LP and the fixed point FP is a first object distance d1. At the second distance z2 from the object, the distance between the laser point LP and the fixed point FP is a second object distance d2.

Because of the parallax between the three optical systems the laser point LP will appear in different positions relative to the distinct field of views of each optical system.

The relationship between a given distance z from the IR camera to the object and the distance d between the laser point LP and a predetermined point in the visual image, and in the IR image, respectively (i.e. the projections of the field of views comprising the reflected laser point onto the sensor arrays and where the processing device 13 generates the visual and infrared images) is given by equation (1):

$$d = c1/z + c2 \qquad (1)$$

Hence, the distance z can be obtained as $$z = c1/(d - c2) \qquad (2)$$

Here c1 and c2 are constants to be determined, d is the distance between the laser point LP and the fixed point FP in the visual image, and z is the distance between the IR camera and the object. The constant c1 is dependent on the distance between the laser point system 22 and the visual optical system 14 and the constant c2 is dependent on the angle $\alpha$ between their optical axes.

Hence, having determined c1 and c2 during calibration, the distance d between the laser point LP and the fixed point FP in the visual image can be used to determine the distance z between the IR camera and the imaged object during normal operation. This distance z will be the focusing distance if the laser point system 22 is pointing at the object that should be in focus. Hence, this information can be used for exact focusing of the IR camera.

Typically the equations (1) and (2) above are calculated separately for the x axis and the y axis of the visual image, that is, for the displacement in the horizontal and vertical direction, respectively.

The displacement d1, d2 of the laser point LP in the visual image as a function of the distance from the IR camera to the object can be determined empirically for example during calibration of the IR camera 10, in the following way as illustrated in FIG. 3:

Step S31: Produce a first visual image of an object at a first known distance z1 from the IR camera. The distance z1 is shown in FIG. 2 and in FIG. 4.

Step S32: Determine the position of the laser point in the first visual image.

Step S33: Produce a second visual image of an object at a second known distance z2 from the IR camera. The distance z2 is shown in FIG. 2 and in FIG. 4, typically relative to a predetermined point in the image.

Step S34: Determine the position of the laser point in the second visual image.

Step S35: For each of the positions of the laser point, determined in steps S32 and S34, determine the relationship between the displacement in the visual image and the distance between the IR camera and the object.

The positions of the laser point may also be used to estimate an equation or a curve for the displacement as a function of the distance to the object. This equation, or curve, is stored in a memory in the IR camera, for example, the memory storage 15, and can be used to determine the displacement needed of the laser point in the IR image in dependence of the distance z to the object as will be discussed in connection with FIGS. 4 and 5.

Figure 4:
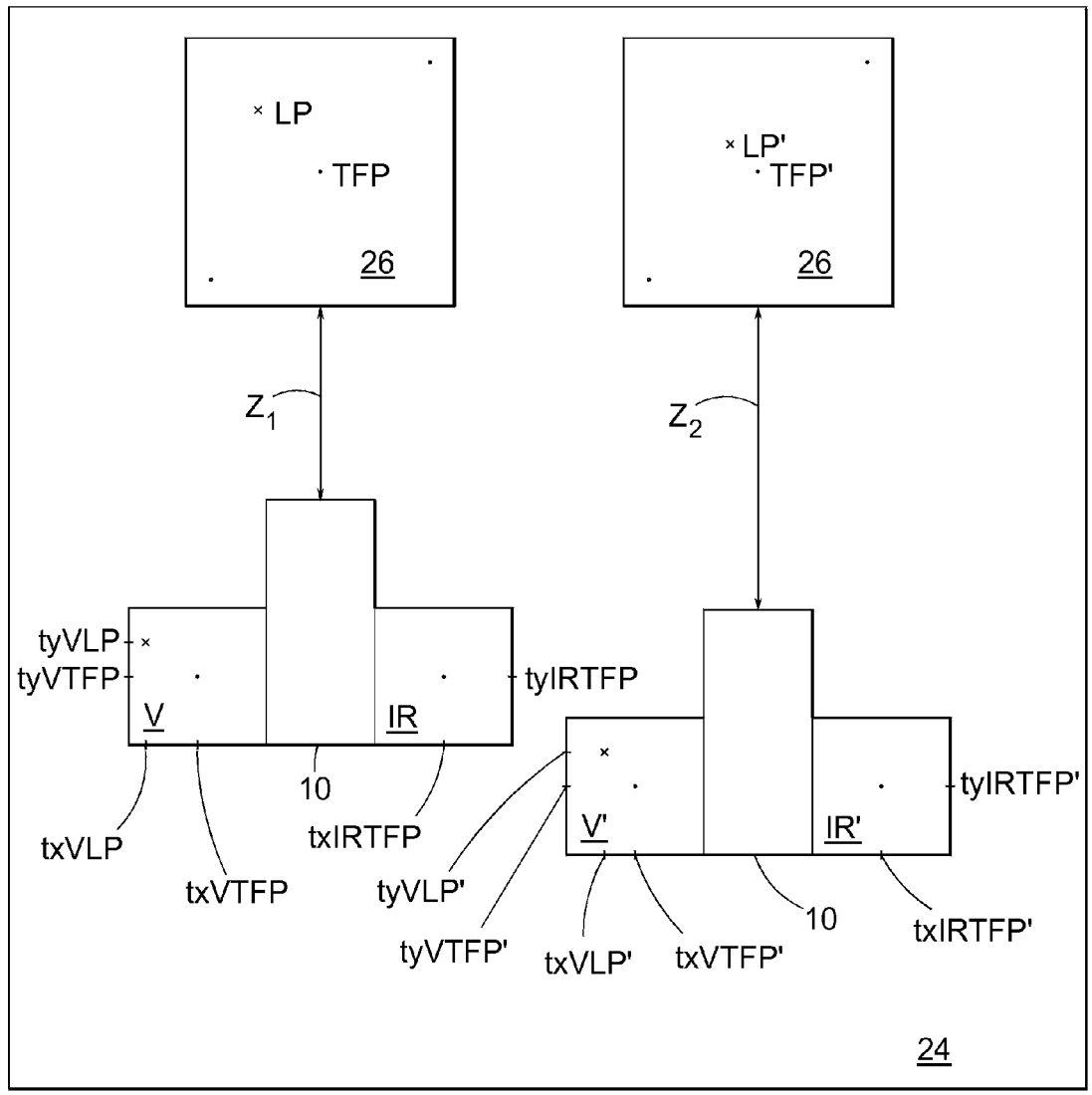
FIG. 4 shows a schematic view of a calibration station.

FIG. 4 shows a calibration station 24 where the calibration coefficients needed to perform fusion between the IR image and the visual image also are determined. This is typically done for every individual produced infrared camera 10 at the calibration station 24. How to determine fusion parameters is known in the art, but will be briefly discussed in the following. The infrared camera 10 is rigged and aligned towards a grid screen 26 (which background color is white), where the distance z between the infrared camera 10 and the grid screen 26 is known. The distance can also be regulated. At least one of the black painted grid points also comprises at least one fixed point which is heated (i.e. a temperature fixed point TFP). The laser point LP is reflected against the screen and detected by the (two-dimensional) visual sensor array 16 of the IR camera 10 in FIG. 1, which will sense at least two pixel coordinates representing the laser point LP. At the same time the at least one temperature fixed point TFP, preferably in the center of the screen, will be detected by both the pixel coordinates in the two dimensional visual sensor array 16 of the IR camera 10 in FIG. 1 since it is painted black, and the infrared sensor array 20 of the IR camera 10 in FIG. 1, since it is heated.

A first visual image V and a first infrared image IR is taken at a known distance z1. The laser point LP will be represented by the coordinates $(tx_{VLP}, ty_{VLP})$ in the visual image. The at least one temperature fixed point TFP will be represented by the coordinates $(tx_{VTFP}, ty_{VTFP})$ and $(tx_{irTFP}, ty_{irTFP})$ in the first visual and infrared image, respectively.

The procedure is repeated at another known distance z2 where a second visual image V' and a second infrared image IR' are taken, which will give a laser point LP' with coordinates $(tx_{VLP'}, ty_{VLP'})$ in the visual image. The at least one temperature fixed point TFP' will be represented by the coordinates $(tx_{VTFP'}, ty_{VTFP'})$ and $(tx_{irTFP'}, ty_{irTFP'})$ in the second visual and infrared image, respectively.

By the repeated procedures both the relation between the different coordinates in the visual and infrared images and the displacement of the laser point between the first and second image occasion are established.

This results in a total of four images i.e. measurements comprising two visual and two infrared images, which will give rise to an equation system where the coefficients are determined, since there now exists two equations for each coordinate. The coefficients in the equations for the infrared coordinates are determined in a way as previously described. The equations and procedures are similar to the first case:

$$Tx_{ir}=d1/z+d2 \quad (3)$$

$$Ty_{ir}=d3/z+d4 \quad (4)$$

And hence the calibration coefficients (d1, d2, d3 and d4), also called the fusion parameters, are determined.

The fusion parameters are then used to determine the relative displacement of the visual image and the IR image in the x and y direction that is needed to align the images. These parameters can also be used to determine the displacement of the laser point in the IR image based on its position in the visual image.

FIG. 5 is a flow chart of how to align the IR images and visual images after calibration, during normal use of the IR camera.

Step S51: emit a laser beam from the laser point system 22 of the IR camera 10 towards an object to generate a reflected laser point on the object.

Step S52: capture a visual image of the object, including the laser point, using the visual optical system 14 of the IR camera 10.

Step S53: determine the distance d between the laser point and a predetermined point in the image, for example, the centre of the image.

Step S54: use the distance d determined in step S53 to determine the distance z between the IR camera 10 and the object.

Step S55: use the distance z to determine the position of the laser point in the IR image based on the fusion parameters.

Step S56: Present the laser point in the IR image. Preferably, the pixels corresponding to the coordinates determined for the laser point in the IR image are highlighted by GUI-symbol technique (GUI=Graphical User Interface) hence showing the laser point correctly aligned in the infrared image for the user.

As the skilled person will realize steps S53 and S54 can be omitted. Instead, equations can be developed based on equations (1)-(4) above, that will permit calculation of the position of the laser point in the IR image in step S54 directly from the position in the visual image. This means that in step S54 the corresponding infrared coordinates $Tx_{ir}$ and $Ty_{ir}$ in the infrared image, may be calculated by the processing device 13 based on the information of the position of the laser point in the visual image.

Before the images are presented they must be processed to enable the display. Especially if the visual and IR images are to be fused, or blended, they must be aligned. This is well known to the skilled person but will be outlined below. Since the field of view for the visual optical system 14 is approximately twice the angle of the field of view for the infrared optical system 18 it will normally completely cover the area of the object viewed by the infrared optical system 18. Only the visual area overlapping the infrared area is taken into account, and a large amount of the visual information is therefore deleted. The laser point system 22 is placed in the vicinity of the infrared optical system 18, which is advantageous. The reflected laser point will always be in the area of the object which the infrared optical system covers, and will hence always be detected by the visual optical system 14.

The size of a sensing element is related to the wavelength of the radiation it detects, and an infrared sensing element is typically at least three times a corresponding element for the visual wavelength. This makes the infrared sensor array 20 of a lower resolution, since it has larger sensor elements or pixels than the visual sensor array 16, and the size of a pixel in the infrared sensor array 20 could comprise at least three pixels of the visual sensor array 16, normally more.

The visual information is appropriately cut and aligned with corresponding information in the infrared image in a suitable manner by the fusion parameter where both the field of view and the different array resolutions must be taken into account when aligning and scaling the images.

The invention claimed is:

1. A method for locating coordinates in an infrared ("IR") image, the method comprising:
   generating a laser spot on an object, wherein the laser spot is generated by a laser pointing device;
   receiving emitted and reflected radiation from the object, wherein the received radiation includes radiation from the laser spot;
   generating a visual image from a visual sensor and an IR image from an IR sensor, wherein both images are based on the received radiation;
   detecting visual image coordinates of the laser spot in the visual image;
   determining an offset between the visual image coordinates and a predetermined point in the visual image;
   determining a distance between the IR camera and the object based on the offset; and
   determining the IR image coordinates of the laser spot in the IR image based on the distance between the IR camera and the object and a displacement parameter related to the displacement between the visual image and the IR image.

2. The method according to claim 1, wherein the distance between the IR camera and the object is determined based on a constant determined during a calibration of the IR camera prior to receiving the radiation from the object.

3. The method according to claim 1, wherein the distance between the IR camera and the object is determined based on a first constant related to the distance between the laser pointer and the visual sensor and a second constant related to the angle between the optical axis of the laser pointer and the optical axis of the visual sensor.

4. The method of claim 3, wherein the at least one displacement parameter is a fusion parameter.

5. The method of claim 1, wherein the at least one displacement parameter is a fusion parameter.

6. The method of claim 1, further comprising:
   creating a blended image based on at least part of the visual image and at least part of the IR image; and
   highlighting the IR image coordinates in the blended image.

7. The method of claim 1 further comprising:
   highlighting the IR image coordinates in the IR image.

8. The method of claim 1, wherein the predetermined point in the visual image is the center of the visual image.

9. An infrared ("IR") camera comprising:
   a laser pointing device for providing a laser spot on an object;
   an IR sensor for capturing IR data relating to the object;
   a visual sensor for capturing visible light data relating to the object, wherein the visual light data includes data concerning the laser spot;
   memory storing instructions for:
      generating a visual image based on the visible light data captured by the visual sensor;
      generating an IR image based on the IR data captured by the IR sensor;

detecting visual image coordinates of the laser spot in the visual image;

determining an offset between the visual image coordinates and a predetermined point in the visual image;

determining a distance between the IR camera and the object based on the offset; and determining the IR image coordinates of the laser spot in the IR image, based on the distanced between the IR camera and the object and a displacement parameter related to the displacement between the visual image and the IR image; and a processor for executing the instructions.

10. The IR camera according to claim 9, wherein the distance between the IR camera and the object is determined based on a constant determined during a calibration of the IR camera prior to the sensors capturing the visual light and IR data relating to the object.

11. The IR camera according to claim 9, wherein the distance between the IR camera and the object is determined based on a first constant related to the distance between the laser pointer and the visual sensor and a second constant related to the angle between the optical axis of the laser pointer and the optical axis of the visual sensor.

12. The method of claim 11, wherein the at least one displacement parameter is a fusion parameter 13. The IR camera of claim 9, wherein the at least one displacement parameter is a fusion parameter.

14. The IR camera of claim 9, wherein the memory further stores instructions for:

creating a blended image based on at least part of the visual image and at least part of the IR image; and highlighting the IR image coordinates in the blended image.

15. The method of claim 9, wherein the memory further stores instructions for:

highlighting the IR image coordinates in the IR image.

16. The method of claim 9, wherein the predetermined point in the visual image is the center of the visual image.

* * * * *